(12) United States Patent
Rowe et al.

(10) Patent No.: US 9,278,392 B2
(45) Date of Patent: Mar. 8, 2016

(54) SYNTHESIS OF METAL ALLOY NANOPARTICLES VIA A NEW REAGENT

(71) Applicant: Toyota Motor Engineering & Manufacturing North America, Inc., Erlanger, KY (US)

(72) Inventors: Michael Paul Rowe, Pinckney, MI (US); Daniel Jeffrey Herrera, Questa, NM (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 167 days.

(21) Appl. No.: 14/046,129

(22) Filed: Oct. 4, 2013

(65) Prior Publication Data

US 2015/0099117 A1  Apr. 9, 2015

(51) Int. Cl.
*B22F 9/24* (2006.01)
*C22C 22/00* (2006.01)
*C22C 1/00* (2006.01)
*H01F 1/06* (2006.01)
*B82Y 30/00* (2011.01)
*B82Y 40/00* (2011.01)
*H01F 1/00* (2006.01)

(52) U.S. Cl.
CPC ... *B22F 9/24* (2013.01); *C22C 1/00* (2013.01); *C22C 22/00* (2013.01); *B22F 2009/245* (2013.01); *B82Y 30/00* (2013.01); *B82Y 40/00* (2013.01); *C22C 2202/02* (2013.01); *H01F 1/0054* (2013.01); *H01F 1/065* (2013.01); *Y10S 977/773* (2013.01); *Y10S 977/838* (2013.01); *Y10S 977/896* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 7,785,392 B2* | 8/2010 | Shim et al. | 75/351 |
| 8,192,866 B2* | 6/2012 | Golightly et al. | 429/218.1 |
| 8,372,177 B1* | 2/2013 | Thoma et al. | 75/362 |
| 8,395,003 B2* | 3/2013 | Leger et al. | 585/277 |
| 2009/0090214 A1* | 4/2009 | Cheng | 75/370 |
| 2013/0084502 A1* | 4/2013 | Singh et al. | 429/232 |
| 2015/0068646 A1* | 3/2015 | Rowe | 148/300 |

FOREIGN PATENT DOCUMENTS

| | | |
|---|---|---|
| CN | 102909381 A | 6/2013 |
| WO | 2011150212 A2 | 12/2011 |
| WO | 2013056185 A1 | 4/2013 |

OTHER PUBLICATIONS

Suzuki et al. "Spin reorientation transition and hard magnetic properties of MnBi intermetallic compound", J. Appl. Phys., 111 article No. 07E303, Feb. 8, 2012.
Yang et al. "Temperature dependences of structure and coercivity for melt-spun MnBi compound" J. Magnetism Magnet. Mat., 330, 106-110, Nov. 5, 2012.
Yang et al. "Anisotropic nanocrystalline MnBi with high coercivity at high temperature", Appl. Phys. Lett., 99, article No. 082505, Aug. 25, 2011.

* cited by examiner

*Primary Examiner* — George Wyszomierski
(74) *Attorney, Agent, or Firm* — Christopher G. Darrow; Darrow Mustafa PC

(57) ABSTRACT

Methods for producing nanoparticles of metal alloys and the nanoparticles so produced are provided. The methods include addition of surfactant and cationic metal to a novel reagent complex between zero-valent metal and a hydride. The nanoparticles of zero-valent metal alloys produced by the method include ~7 nm zero-valent manganese-bismuth useful in fabricating a less expensive permanent magnet.

22 Claims, 3 Drawing Sheets

SYNTHESIS OF METAL ALLOY NANOPARTICLES VIA A NEW REAGENT

TECHNICAL FIELD

The present invention relates in general to a method of preparing nanoparticles of metal alloys, in particular nanoparticles of a manganese-bismuth alloy, and nanoparticles of metal alloys and compositions containing the same, in particular nanoparticles of a manganese-bismuth alloy.

BACKGROUND

Metal nanoparticles, particles of elemental metal in pure or alloyed form with a dimension less than 100 nm, have unique physical, chemical, electrical, magnetic, optical, and other properties in comparison to their corresponding bulk metals. As such they are in use or under development in fields such as chemistry, medicine, energy, and advanced electronics, among others.

Synthetic methods for preparing metallic nanoparticles are typically characterized as being "top-down" or "bottom-up" and comprise a variety of chemical, physical, and even biological approaches. Top-down techniques involve the physical breakdown of macroscale or bulk metals into nanoscale particles, using a variety of energy inputs. Bottom-up methods involve the formation of nanoparticles from isolated atoms, molecules, or clusters.

Physical force methods for top-down metal nanoparticle synthesis have included milling of macroscale metal particles, laser ablation of macroscale metals, and spark erosion of macroscale metals. Chemical approaches to bottom-up synthesis commonly involve the reduction of metal salt to zero-valent metal coupled with growth around nucleation seed particles or self-nucleation and growth into metal nanoparticles.

While each of these methods can be effective in certain circumstances, each also has disadvantages or situational inapplicability. Direct milling methods can be limited in the size of particles obtainable (production of particles smaller than ~20 nm is often difficult) and can lead to loss of control of the stoichiometric ratios of alloys. Other physical methods can be expensive or otherwise unamenable to industrial scale. On the other hand, bottom-up chemical reduction techniques can fail in situations where metallic cations are resistant to chemical reduction. Mn(II) for example is virtually impervious to chemical reduction, making this approach inapplicable to the preparation of $Mn^0$ nanoparticles or nanoparticles of $Mn^0$-containing alloys.

Manganese-bismuth (MnBi) is one example, among many, of a zero-valent metal alloy whose nanoparticulate form is of considerable interest in applied technological fields. MnBi has been shown to have very high coercivity, a ferromagnetic property in which a magnet is strongly resistant to de-magnetization by an opposing magnetic field. Current state-of-the-art, high-coercivity magnets, or "hard magnets", which are required in a variety of advanced electronic applications, typically include expensive rare-earth metals such as in the neodymium iron borate magnet. MnBi nanoparticles of consistently small dimension are predicted to have coercivities that rival or exceed those of materials such as neodymium iron borate.

SUMMARY

A method for synthesizing metal alloy nanoparticles and the nanoparticles synthesized thereby is provided.

In one aspect, a method for synthesizing metal alloy nanoparticles is disclosed. The method includes the step of adding surfactant and a cationic metal to a reagent complex according to Formula I:

$$M^0 \cdot X_y \qquad \qquad \text{I,}$$

wherein $M^0$ is one or more metal atoms in oxidation state zero, wherein X is a hydride, and wherein y can be a value greater than zero. As described, the reagent complex can be a complex of a zero-valent metal and a hydride. In some variations the reagent complex can be in suspended contact with a solvent at the time of addition. In some variations, the hydride can be lithium borohydride, the zero-valent metal can be manganese, the cationic metal can be cationic bismuth, the surfactant can be heptylcyanide, or any combination thereof.

In another aspect, metal alloy nanoparticles and their method of synthesis are disclosed. The method includes the step of adding surfactant and a cationic metal to a reagent complex according to Formula I:

$$M^0 \cdot X_y \qquad \qquad \text{I,}$$

wherein $M^0$ is one or more metal atoms in oxidation state zero, wherein X is a hydride, and wherein y can be a value greater than zero. As described, the reagent complex can be a complex of a zero-valent metal and a hydride. In some variations the reagent complex can be in suspended contact with a solvent at the time of addition. In some variations, the hydride can be lithium borohydride, the zero-valent metal can be manganese, the cationic metal can be cationic bismuth, the surfactant can be heptylcyanide, or any combination thereof. In some variations the metal alloy nanoparticles can consist essentially of an alloy of manganese-bismuth, the nanoparticles' maximum average dimension can about 7 nm, or both.

In another aspect manganese-bismuth nanoparticles are disclosed. The manganese bismuth nanoparticles can be characterized in that their average maximum dimension is 5-10 nm and the manganese and bismuth are in an alloyed state and have an oxidation state of zero.

In another aspect a magnetic material is disclosed. The magnetic material can have coercivity equal to or greater than 1.1 Tesla, up to or greater than 3.5 Tesla, and can comprise nanoparticles consisting essentially of zero-valent manganese and zero-valent bismuth and having an average maximum dimension less than about 10 nm.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

Figure 1:
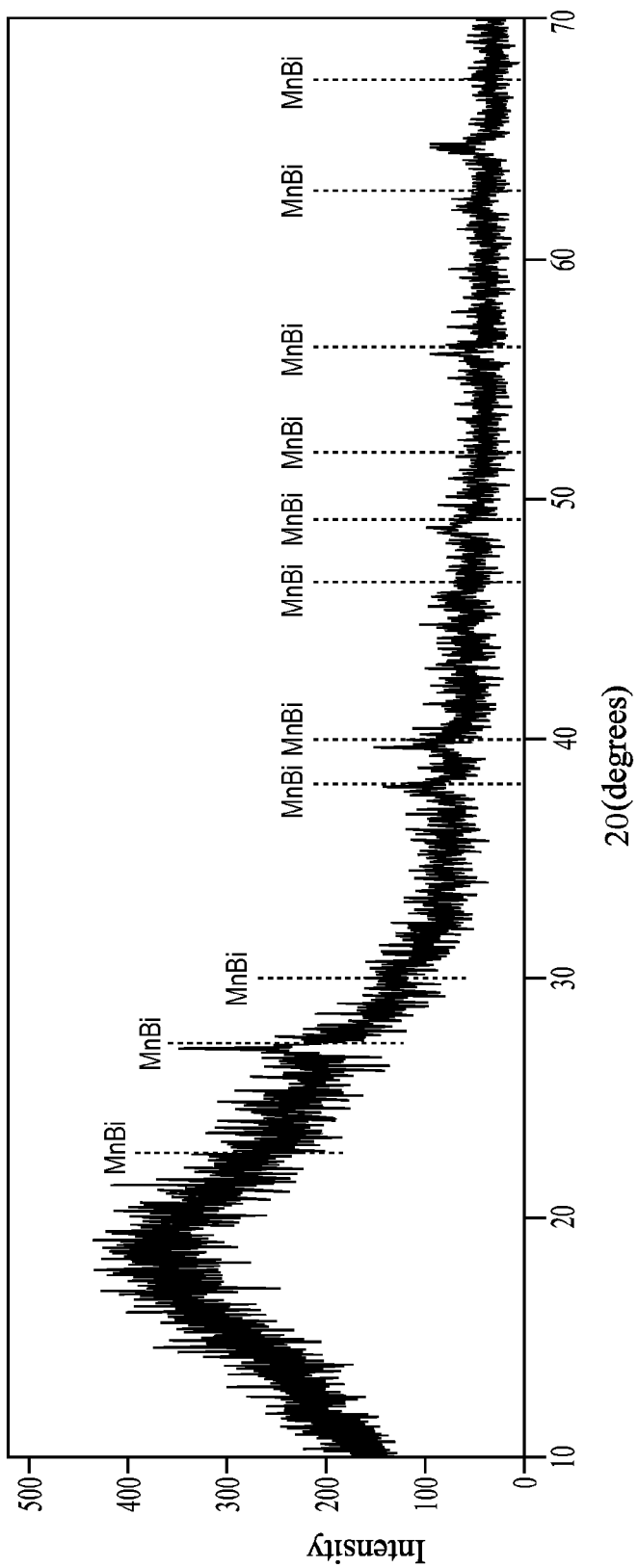
FIG. 1 is an x-ray diffraction spectrum of manganese-bismuth nanoparticles prepared by a method for synthesizing metal alloy nanoparticles.

A method for synthesizing metal alloy nanoparticles, the nanoparticles so synthesized, and compositions comprising the nanoparticles are described. As explained in the following description, the method involves a reaction between a surfactant, a cationic metal, and a novel reagent complex comprising a zero-valent metal and a hydride. A "zero-valent metal" can alternatively be described as a metal which is in oxidation state zero.

As used here, a "metal" can refer to an alkaline earth metal, an alkali metal, a transition metal, or a post-transition metal. The phrase "transition metal" can refer to any D-block metal of Groups 3 through 12. The phrase "post-transition metal" can refer to any metal of Groups 13 through 16, including aluminum, gallium, indium, tin, thallium, lead, or bismuth. In some examples a metal will be manganese or bismuth.

As used here, a "hydride" can be a solid binary metal hydride (e.g. NaH, or $MgH_2$), binary metalloid hydride (e.g. $BH_3$), complex metal hydride (e.g. $LiAlH_4$), or complex metalloid hydride (e.g. $LiBH_4$). The term "metalloid" can refer to any of boron, silicon, germanium, arsenic, antimony, tellurium, or polonium. In some examples the hydride will be $LiBH_4$. Any member of a group consisting of complex metal hydrides and complex metalloid hydrides can be called a "complex hydride". It is to be appreciated that the term hydride as used herein can also encompass a corresponding deuteride or tritide.

A method for synthesizing metal alloy nanoparticles includes the step of adding surfactant and a cationic metal to a complex according to Formula I:

$$M^0\text{-}X_y \qquad \qquad \text{I,}$$

wherein $M^0$ is one or more metal atoms in oxidation state zero, wherein X is a hydride, and wherein y can be a value greater than zero. In many instances y can be a value greater than zero and less than or equal to four. The value represented by y can be an integral value or a fractional value, such as 2.5. The complex according to Formula I will be alternatively referred to herein as a "reagent complex".

The reagent complex can be a complex of individual molecular entities, such as a single metal atom in oxidation state zero complexed to one or more hydride molecules. Alternatively the complex described by Formula I can exist as a molecular cluster, such as a cluster of metal atoms in oxidation state zero interspersed with hydride molecules, or a cluster of metal atoms in oxidation state zero, the cluster-surface coated with hydride molecules or hydride molecules permeated throughout the cluster.

In some aspects of the method for synthesizing metal alloy nanoparticles, the reagent complex can be in suspended contact with a solvent or solvent system. In some variations, suitable solvents or solvent systems will include those in which a suspension of the reagent complex is stable for an interval of at least one day in an inert environment. In some variations, suitable solvents or solvent systems will include those in which a suspension of the reagent complex is stable for an interval of at least one hour in an inert environment. In some variations, suitable solvents or solvent systems will include those in which a suspension of the reagent complex is stable for an interval of at least five minutes in an inert environment.

The phrase "an inert environment" as used here can include an atmospheric environment that is anhydrous. The phrase "an inert environment" as used here can include an atmospheric environment that is oxygen-free. The phrase "an inert environment" as used here can include an atmospheric environment that is both anhydrous and oxygen-free. The phrase "an inert environment" as used here can include enclosure in an ambient atmosphere comprising an inert gas such as argon, or enclosure in a space that is under vacuum.

The term "stable" as used in the phrase, "in which the reagent complex is stable for an interval" can mean that the reagent complex does not appreciably dissociate or undergo covalent transformation.

The solvent or solvent system employed in certain various aspects disclosed here can be a material that is non-reactive toward the hydride incorporated into the reagent complex. As used above in the phrase "material that is non-reactive toward the hydride", the term "non-reactive" can mean that the material, i.e. the solvent or solvent system, does not directly participate in or bring about covalent reaction of the hydride of the reagent complex to a thermodynamically significant extent. According to such a criterion, suitable solvents or solvent systems can vary depending on the hydride being used. In some variations this can include a solvent or solvent system that is aprotic, non-oxidative or both.

Non-limiting examples of suitable solvents or solvent system components can include acetone, acetonitrile, benzene, 1-butanol, 2-butanol, 2-butanone, t-butyl alcohol, carbon tetrachloride, chlorobenzene, chloroform, cyclohexane, 1,2-dichloroethane, diethyl ether, diethylene glycol, diglyme (diethylene glycol, dimethyl ether), 1,2-dimethoxy-ethane (glyme, DME), dimethylether, dimethyl-formamide (DMF), dimethyl sulfoxide (DMSO), dioxane, ethanol, ethyl acetate, ethylene glycol, glycerin, heptane, Hexamethylphosphoramide (HMPA), Hexamethylphosphorous triamide (HMPT), hexane, methanol, methyl t-butyl ether (MTBE), methylene chloride, N-methyl-2-pyrrolidinone (NMP), nitromethane, pentane, Petroleum ether (ligroine), 1-propanol, 2-propanol, pyridine, tetrahydrofuran (THF), toluene, triethyl amine, o-xylene, m-xylene, or p-xylene.

As non-limiting examples, in some instances a halogenated alkyl solvent can be acceptable, in some instances an alkyl sulfoxide can be acceptable, in other instances an ethereal solvent can be acceptable. In some variations THF can be a suitable solvent or solvent system component.

In some aspects of the method for synthesizing metal alloy nanoparticles, the surfactant, the cationic metal, or both can be suspended or dissolved in a solvent or solvent system. In some variations wherein the surfactant and the cationic metal are both dissolved or suspended in a solvent or solvent system, the surfactant and the cationic metal can be dissolved or suspended in combination with one another in the same solvent or solvent system. In some variations where the surfactant and the cationic metal are both dissolved or suspended in a solvent or solvent system, the surfactant and the cationic metal can be separately dissolved or suspended in solvents or solvent systems of the same composition. In some variations where the surfactant and the cationic metal are both dissolved or suspended in a solvent or solvent system, the surfactant and the cationic metal can be separately dissolved or suspended in solvents or solvent systems of different composition.

In some aspects of the method for synthesizing metal alloy nanoparticles, the reagent complex can be in suspended contact with a solvent or solvent system and the surfactant, the cationic metal, or both can be suspended or dissolved in a solvent or solvent system. In different variations wherein the reagent complex is in suspended contact with a solvent or solvent system and the surfactant is suspended or dissolved in a solvent or solvent system, the reagent complex can be in suspended contact with a solvent or solvent system of the same or different composition as compared to the solvent or solvent system in which the surfactant is dissolved or suspended.

In different variations wherein the reagent complex is in suspended contact with a solvent or solvent system and the cationic metal is suspended or dissolved in a solvent or solvent system, the reagent complex can be in suspended contact with a solvent or solvent system of the same or different composition as compared to the solvent or solvent system in which the cationic metal is dissolved or suspended.

In different variations wherein the reagent complex is in suspended contact with a solvent or solvent system and the surfactant and the cationic metal are suspended or dissolved in a solvent or solvent system, the reagent complex can be in suspended contact with a first solvent or solvent system and the surfactant and the cationic metal can be dissolved or suspended in combination with one another in a second solvent or solvent system. In some instances the first solvent or solvent system can have the same composition as the second solvent or solvent system, and in others the first solvent or solvent system can have a different composition as compared to the second solvent or solvent system.

In other variations wherein the reagent complex is in suspended contact with a solvent or solvent system and the surfactant and the cationic metal are suspended or dissolved in a solvent or solvent system, the reagent complex can be in suspended contact with a first solvent or solvent system, the surfactant can be dissolved or suspended in a second solvent or solvent system, and the cationic metal can be dissolved or suspended in a third solvent or solvent system. In some instances, the first, second, and third solvents or solvent systems can have the same composition. In other instances, the first and second solvents or solvent systems can have the same composition while the third solvent or solvent system has a different composition. In yet other instances, the second and third solvent or solvent system can have the same composition while the first solvent or solvent system has a different composition. In yet other instances, the first and third solvent or solvent system can have the same composition while the second solvent or solvent system has a different composition. In yet other instances the first, second, and third solvents or solvent systems can have differing compositions.

In some variations where the reagent complex is in suspended contact with a first solvent or solvent system, the surfactant is dissolved or suspended in a second solvent or solvent system, and the cationic metal is dissolved or suspended in a third solvent or solvent system, the surfactant and the cationic metal can be added to the reagent complex simultaneously.

In other variations where the reagent complex is in suspended contact with a first solvent or solvent system, the surfactant is dissolved or suspended in a second solvent or solvent system, and the cationic metal is dissolved or suspended in a third solvent or solvent system, the cationic metal can be added to the reagent complex prior to addition of the surfactant. This can include a situation where a fraction of the cationic metal is added to the reagent complex prior to addition of the surfactant and the remainder of the cationic metal.

In other variations where the reagent complex is in suspended contact with a first solvent or solvent system, the surfactant is dissolved or suspended in a second solvent or solvent system, and the cationic metal is dissolved or suspended in a third solvent or solvent system, the surfactant can be added to the reagent complex prior to addition of the cationic metal. This can include a situation where a fraction of the surfactant is added to the reagent complex prior to addition of the cationic metal and the remainder of the surfactant. In some instances where the surfactant is added prior to the catalytic metal, in whole or in part, it can be desirable to add the cationic metal quickly after adding the surfactant, as surfactant addition can in some cases cause nanoparticles consisting essentially of the zero-valent metal, $M^0$, to form.

In some aspects of the method for synthesizing metal alloy nanoparticles, the reagent complex can be combined with surfactant, the cationic metal, or both in the absence of solvent. In some such cases a solvent or solvent system can be added subsequent to such combination.

The cationic metal can include at least one ionic metal of atomic number different from that of the zero-valent metal $M^0$ utilized in the reagent complex. In some variations the cationic metal can include a salt of a transition metal or a post-transitional metal. In some instances the cationic metal can include a salt of bismuth.

It is to be understood that, in the performance of the method for synthesizing metal alloy nanoparticles, more than one cationic metal can be added to the reagent complex. This could be achieved by adding more than one metallic salt to the reagent complex or by adding a polymetallic salt to the reagent complex. Addition of more than one cationic metal to the reagent complex during performance of the method for synthesizing metal alloy nanoparticles can result in production of zero-valent metal alloys nanoparticles comprising an alloy of more than two metals.

Without being bound by any particular mechanism, it is believed that upon addition of surfactant and catalytic metal to the reagent complex, the hydride incorporated into the reagent complex can reduce the cationic metal to oxidation state zero. In some aspects of the method for synthesizing metal alloy nanoparticles, it may be desirable to ensure that sufficient equivalents of hydride are present in the reagent complex to reduce the added cationic metal to oxidation state zero. In some instances it may be desirable to add additional equivalents of the hydride to the reagent complex, either prior or simultaneous to addition of the surfactant and or the cationic metal. Such instances may include situations where the cationic metal in an oxidation state greater than +1, where the cationic metal is added in greater molar quantity than that of $M^0$ in the reagent complex, or where more than one cationic metal is added to the reagent complex. Alternatively in such instances, a reagent complex in which y is greater than one can be employed.

The surfactant employed in the method for synthesizing metal alloy nanoparticles can be any known in the art. Non-limiting examples of suitable surfactants can include non-ionic, cationic, anionic, amphoteric, zwitterionic, and polymeric surfactants and combinations thereof. Such surfactants typically have a lipophilic moiety that is hydrocarbon based, organosilane based, or fluorocarbon based. Without implying limitation, examples of types of surfactants which can be suitable include alkyl sulfates and sulfonates, petroleum and lignin sulfonates, phosphate esters, sulfosuccinate esters, carboxylates, alcohols, ethoxylated alcohols and alkylphenols, fatty acid esters, ethoxylated acids, alkanolamides, ethoxylated amines, amine oxides, nitriles, alkyl amines, quaternary ammonium salts, carboxybetaines, sulfobetaines, or polymeric surfactants.

In some instances the surfactant employed in the method for synthesizing metal alloy nanoparticles will be one capable of oxidizing, protonating, or otherwise covalently modifying the hydride incorporated in the reagent complex. In some variations that surfactant can be a nitrile. In some examples that surfactant can be heptylcyanide.

In different aspects the cationic metal employed in the method for synthesizing metal alloy nanoparticles can be a cationic transition metal, post-transition metal, alkali metal, or alkaline earth metal. Non-limiting suitable examples of the cationic metal can include cations of cadmium, cobalt, copper, chromium, iron, gold, silver, platinum, bismuth, or tin. Such cations can include any non-zero (positive) oxidation state of the metal. Cationic metals will in many instances be employed in the method for synthesizing metal alloy nanoparticles as a salt component with one or more anions. In some such cases the anions may be chosen for suitability with any relevant solvent or solvent systems.

In some variations the method for synthesizing metal alloy nanoparticles can be performed under an anhydrous environment, under an oxygen-free environment, or under an environment that is anhydrous and oxygen-free. For example, the method for synthesizing metal alloy nanoparticles can be performed under argon gas or under vacuum. While the zero-valent metal $M^0$ can contain some impurities such as metal oxides, the method for synthesizing metal alloy nanoparticles can in some instances produce pure metal nanoparticles, free of oxide species.

FIG. 1 shows an x-ray diffraction spectrum of MnBi nanoparticles prepared by the method for synthesizing metal alloy nanoparticles. Dashed vertical lines overlaying the spectrum point out the locations of MnBi reference peaks. The acquired spectrum indexes to pure MnBi alloy with a particle size of ~7 nm.

The complex of Formula I can be produced by any suitable process. A non-limiting example of a suitable process for preparing the complex of Formula I includes a step of ball-milling a hydride with a preparation composed of a zero-valent metal. A process employing this step for production of a reagent complex will be referred to herein as the "example process". In many instances the preparation composed of a zero-valent metal employed in the example process will have a high surface-area-to-mass ratio. In some instances the preparation composed of a zero-valent metal will be a metal powder. It is contemplated that the preparation composed of a zero-valent metal could be a highly porous metal, a metal with a honeycomb structure, or some other preparation with a high surface-area-to-mass ratio.

It is to be understood that the zero-valent metal, be it transition metal, post-transition metal, alkali metal, or alkaline earth metal, will be in oxidation state zero. As used herein, "zero-valent" and "oxidation state zero" are taken to mean that the material can exhibit a substantial, but not necessarily complete, zero oxidation state. For example, the preparation containing a zero-valent metal can include some surface impurities such as oxides.

It is contemplated that the phrase "high-surface-area-to-mass ratio" can encompass a broad range of surface-area-to-mass ratios and, in general, the surface-area-to-mass ratio of the preparation composed of a zero-valent metal employed will be that which is required by the time constraints of the example process. In many instances, a higher surface-area-to-mass ratio of the preparation composed of a zero-valent metal will lead to more rapid completion of the example process. In the case where the preparation composed of a zero-valent metal is a metal powder for example, smaller particle size of the metal powder can tend to lead to more rapid completion of the example process for and resultant production of the reagent complex.

Non-limiting examples of hydrides suitable for use in the example process include sodium borohydride, lithium aluminium hydride, diisobutylaluminium hydride (DIBAL), Lithium triethylborohydride (super hydride), sodium hydride, potassium hydride, calcium hydride, lithium borohydride, and LiH.

In some variations of the example process, the hydride can be mixed with the preparation composed of a zero-valent metal in a 1:1 stoichiometric ratio of hydride molecules to zero-valent metal atoms. In other variations the stoichiometric ratio can be 2:1, 3:1, 4:1 or higher. In some variations the stoichiometric ratio of hydride molecules to metal atoms in the preparation composed of a zero-valent metal can also include fractional quantities, such as 2.5:1. It is to be understood that, in cases where the example process is employed for production of the reagent complex, the stoichiometry of admixture in the example process will tend to control the stoichiometry of the complex according to Formula I as indicated by the value of y.

It is contemplated that the ball mill used in in the example process can be of any type. For example the ball mill employed can be a drum ball mill, a jet mill, a bead mill, a horizontal rotary ball mill, a vibration ball mill or a planetary ball mill. In some examples the ball mill employed in the example process will be a planetary ball mill.

It is contemplated that the ball-milling media used in the example process can be of any composition. For example, the ball-milling media employed can be composed of metal such as stainless steel, brass, or hardened lead or they can be composed of ceramic such as alumina or silica. In some variations the ball milling media in the example process will be stainless steel. It is to be appreciated that the ball-milling media can be of a variety of shapes, for example they can be cylindrical or spherical. In some variations the ball-milling media will be spherical.

Optionally, a variety of analytical techniques can be employed to monitor the example process and to determine successful completion thereof. Some such techniques, such as x-ray photoelectron spectroscopy (XPS) and x-ray diffraction (XRD) are discussed below, but any analytical approach known to be useful in the art can be optionally employed.

Figure 2A:
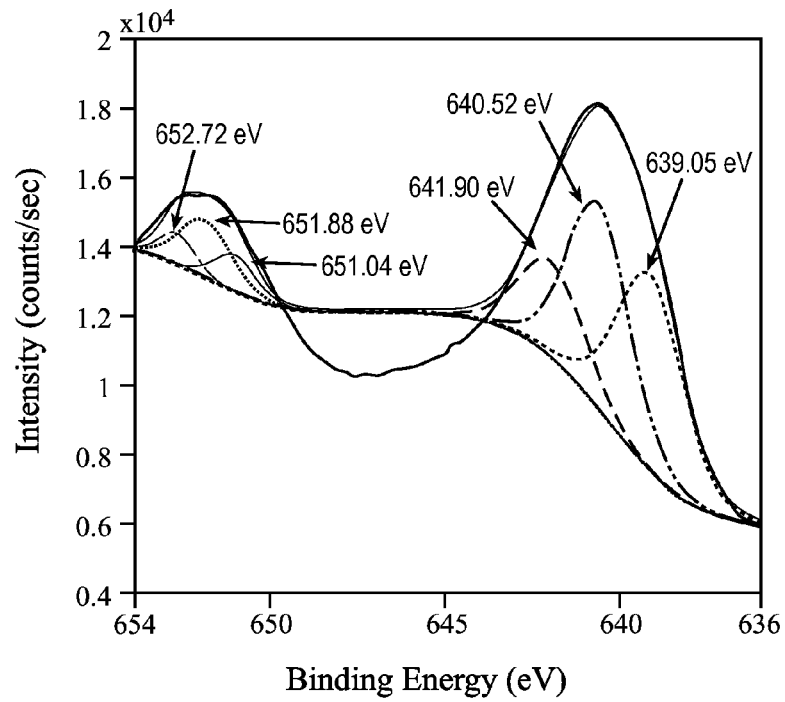
FIG. 2A is a manganese-region x-ray photoelectron spectrum of zero-valent manganese.
Figure 2B:
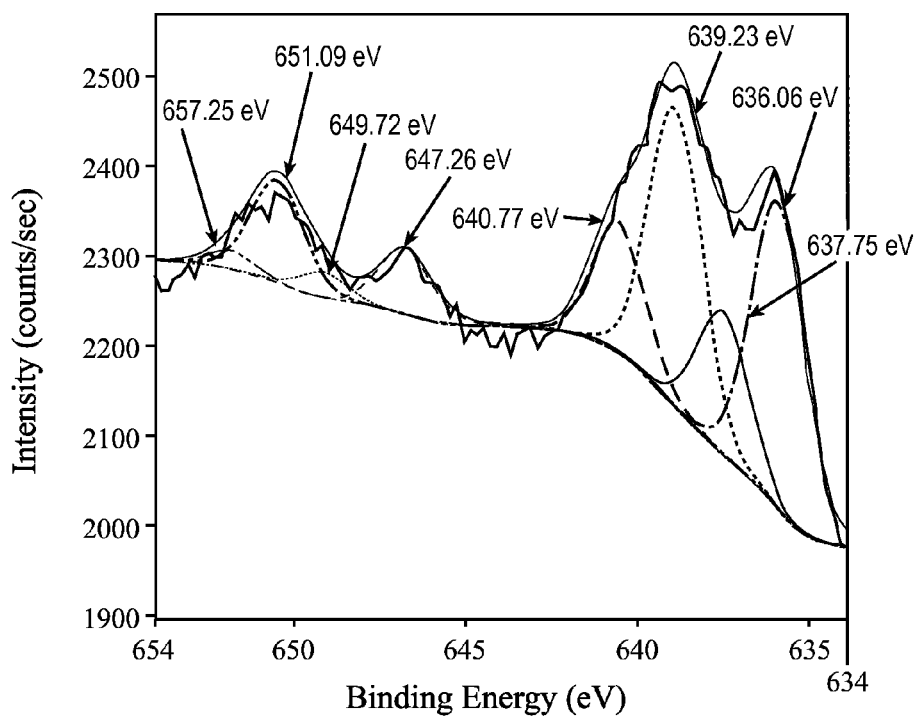
FIG. 2B is a manganese-region x-ray photoelectron spectrum of a $Mn \cdot (LiBH_4)_2$ complex.

XPS scans in the manganese region are shown for zero-valent manganese powder and for a reagent complex Mn·(LiBH$_4$)$_2$, in FIGS. 2A and 2B, respectively. In FIGS. 2A and 2B the heavy solid lines show the raw XPS data and light solid lines show the adjusted data. Dashed and/or dotted lines show the individual deconvoluted peaks of the spectra. The center points in electron Volts of deconvoluted peak maxima are indicated by arrows.

Figure 2C:
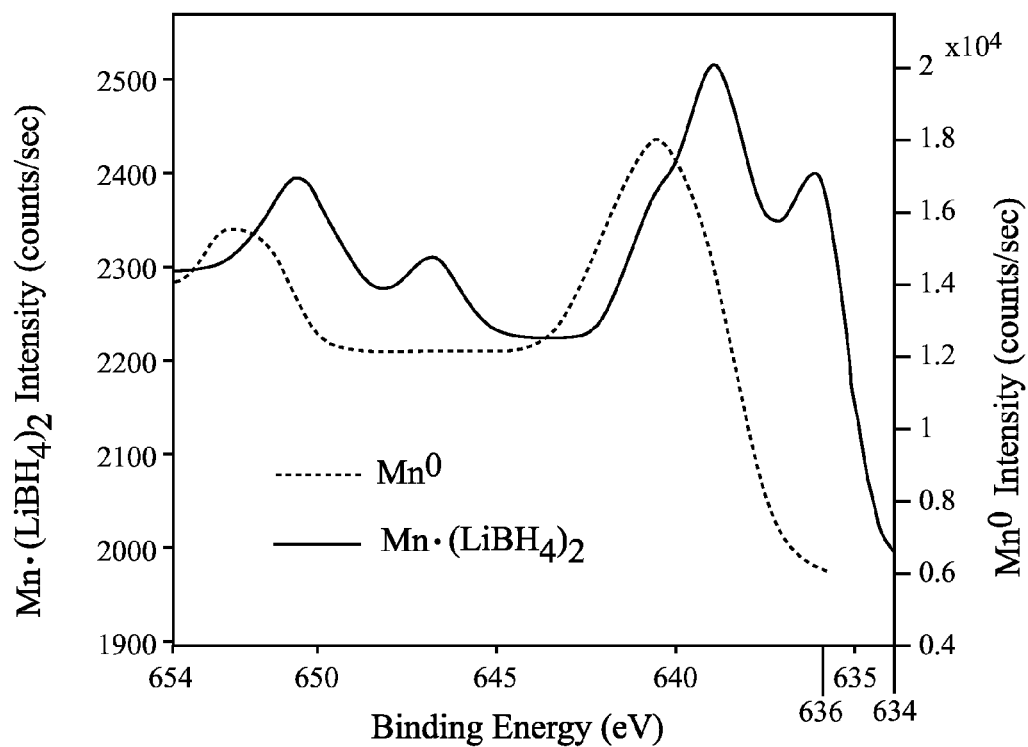
FIG. 2C is an overlay of the x-ray photoelectron spectrum of zero-valent manganese of FIG. 2A and the x-ray photoelectron spectrum of a $Mn \cdot (LiBH_4)_2$ complex of FIG. 2B.

FIG. 2C shows an overlay of the adjusted spectrum of uncomplexed manganese (dotted line), from FIG. 2A, with the adjusted spectrum of the Mn·(LiBH$_4$)$_2$ complex (solid line), from FIG. 2B. As can be seen in FIG. 2C complexation of the manganese to the lithium borohydride results in the appearance of new peaks and a general shift of the spectrum toward lower electronic energy of the observed electrons of the zero-valent metal. In some instances where the reagent complex is prepared by the example process, the x-ray photoelectron spectrum of the zero-valent metal incorporated in the reagent complex will be generally shifted toward lower energy as compared to the spectrum of the uncomplexed zero-valent metal. In some instances, reagent complexes according to Formula I wherein $M^0$ is manganese and X is lithium borohydride can be identified by the presence of an x-ray photoelectron spectroscopy peak centered at about 636 eV.

In some variations the example process will be performed under an anhydrous environment, an oxygen-free environment, or an anhydrous and oxygen-free environment. For example, the example process can be performed under argon gas or under vacuum. This optional feature can be included for example when the hydride used in the example process is a hydride that is sensitive to molecular oxygen, water, or both.

Figure 3:
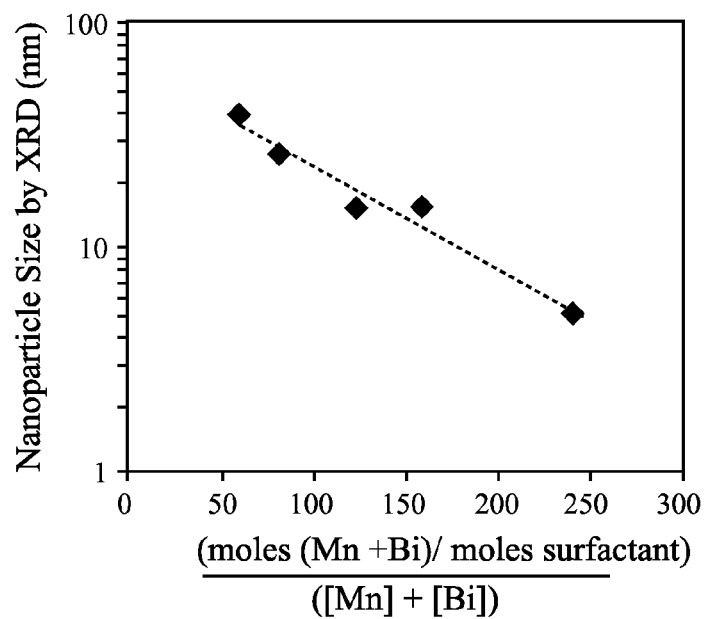
FIG. 3 is a plot of nanoparticle size vs. the stoichiometric ratio of metal atoms to surfactant molecules, divided by the molar concentration of metal atoms employed in the method for synthesizing metal alloy nanoparticles.

In an additional aspect of the method for synthesizing metal alloy nanoparticles, the average maximum dimension of the metal alloy nanoparticles so synthesized can be controlled by modulating the stoichiometric ratio of surfactant molecules to the sum of zero-valent metal atoms and cationic metal atoms. Specifically, the ratio of the number of moles of zero-valent plus cationic metal atoms to the number of moles of surfactant, divided by the sum of molar concentrations of zero-valent and cationic metal atoms, is proportional to the logarithm (base 10) of the size of the resulting nanoparticle, as shown in FIG. 3. This aspect is further described below in Example 2.

For some applications, in variations of the invention wherein nanoparticulate bi-metal alloys of MnBi are produced, an average nanoparticle dimension of 7 nm can be desirable. 7 nm MnBi nanoparticles are predicted to have coercivities as high as 4 T. Incorporation of such nanoparticles into a soft magnetic matrix could therefore offer an option for producing rare earth metal-free alternatives to the standard neodymium iron borate permanent magnet.

Prior efforts to produce MnBi nanoparticles, based on a top-down approach of directly ball-milling MnBi ingots to the nanoscale, have been unable to produce particles smaller than 20 nm. Bottom-up chemical approaches such as reduction of metal salts generally can achieve very small particle sizes, but a straightforward chemical reduction fails in the case of MnBi due to the extreme difficulty in reducing $Mn^{2+}$ salts. The present approach overcomes both of these difficulties, producing MnBi particles of the desired size in a straightforward synthesis and in high purity.

The present invention is further illustrated with respect to the following examples. It needs to be understood that these examples are provided to illustrate specific embodiments of the present invention and should not be construed as limiting the scope of the present invention.

Example 1

One part manganese metal powder is mixed with 2 parts $LiBH_4$, with a total metal powder and $LiBH_4$ powder mass equal to or less than 10 grams, and ball-milled in a planetary ball-mill for 4 hours at 400 rpm (using a Fritsch pulervisette 7 planetary ball mill) in a 250 mL stainless steel airtight ball-mill jar with one ¾ inch, three ½ inch, and five ¼ inch 316 stainless steel ball bearings. A manganese-region x-ray photoelectron spectrum of the ball-milled product shown in FIG. 2B contains two peaks, centered at about 637.75 and 636.06 eV, which are not present in the uncomplexed manganese powder. 0.336 g of the ball-milled product is suspended in 200 mL of THF. Separate from the suspension, 2.215 g of bismuth neodecanoate and 3.07 g of heptylcyanide are dissolved in 200 mL of THF. The bismuth neodecanoate/heptylcyanide solution is added dropwise with stifling to the suspension to form manganese-bismuth nanoparticles of ~5 nm average diameter by x-ray diffraction, as shown in FIG. 1. The entire procedure of Example 1 is performed under an argon atmosphere.

Example 2

Example 1 can be modified in the following way to change the size of metal alloy nanoparticles produced. By varying the relative quantities of $Mn \cdot (LiBH_4)_2$ complex, bismuth neodecanoate, and heptylcyanide while keeping the volume of THF fixed, manganese-bismuth nanoparticles of different sizes can be produced as reported in FIG. 3.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for synthesizing metal alloy nanoparticles, comprising:
adding surfactant and a cationic metal to a reagent complex having a formula, $M^0 \cdot X_y$, wherein $M^0$ is a zero-valent metal, X is a hydride, and y is an integral or fractional value greater than zero.

2. The method of claim 1 wherein the reagent complex is in suspended contact with a solvent.

3. The method of claim 2 wherein the solvent is an ethereal solvent.

4. The method of claim 3 wherein the ethereal solvent is tetrahydrofuran.

5. The method of claim 1 wherein the cationic metal is added simultaneous with or prior to the surfactant.

6. The method of claim 1 wherein the zero-valent metal is a zero-valent transition metal.

7. The method of claim 6 wherein the zero-valent transition metal is a period 4 zero-valent transition metal.

8. The method of claim 1 wherein the cationic metal is a cationic post-transition metal.

9. The method of claim 8 wherein the cationic metal is cationic bismuth.

10. The method of claim 1 wherein the surfactant comprises a nitrile.

11. The method of claim 10 wherein the surfactant comprises heptylcyanide.

12. The method of claim 1 wherein the hydride is a complex hydride.

13. The method of claim 12 wherein the hydride is a borohydride.

14. The method of claim 13 wherein the hydride is lithium borohydride.

15. A method for synthesizing metal alloy nanoparticles, comprising:
adding surfactant and a cationic metal to a reagent complex having a formula:

$Mn^0 \cdot X_y$, wherein $Mn^0$ is zero-valent manganese, X is a hydride, and y is an integral or fractional value greater than zero.

16. The method of claim 15 wherein the complex has an x-ray photoelectron spectroscopy peak centered at about 636 eV.

17. A method for synthesizing metal alloy nanoparticles, comprising:
ball-milling a mixture that includes a hydride and a preparation containing a zero-valent metal to form a reagent complex having a formula:

$M^0 \cdot X_y$, wherein $M^0$ is the zero-valent metal, X is the hydride, and y is an integral or fractional value greater than zero; and
adding surfactant and a cationic metal to the reagent complex.

18. The method of claim 17 wherein the hydride is a complex hydride.

19. The method of claim 18 wherein the hydride is a borohydride.

20. The method of claim 19 wherein the hydride is lithium borohydride.

21. The method of claim 17 wherein the preparation containing a zero-valent metal is a preparation of manganese.

22. The method of claim 17 wherein the hydride and the preparation containing a zero-valent metal are mixed in a stoichiometric ratio of hydride molecules to zero-valent metal atoms of about 1:1, 2:1, 3:1, 4:1, or intermediate ratios.

* * * * *